United States Patent [19]
Leimgruber et al.

[11] 3,929,790
[45] Dec. 30, 1975

[54] ALKYLATION OF IODININ
[75] Inventors: Willy Leimgruber, Montclair; Manfred Weigele, North Caldwell, both of N.J.
[73] Assignee: Hoffmann-La Roche Inc., Nutley, N.J.
[22] Filed: Dec. 4, 1972
[21] Appl. No.: 312,095

Related U.S. Application Data
[63] Continuation-in-part of Ser. No. 818,448, April 22, 1969, abandoned.

[52] U.S. Cl. ............................................... 260/267
[51] Int. Cl.² ....................................... C07D 241/46

[56] References Cited
UNITED STATES PATENTS
3,432,505  3/1969  Rosenbrook et al. ............... 260/267

OTHER PUBLICATIONS
Normant et al. Formation et Réaction Des Anions en Milieu Hexamétapol, 11.–Anions aux Hétéroatomes (O,S,N), Bulletin de la Société Chimique de France, Ser. 5, June 1965, No. 287 relied on.

*Primary Examiner*—Donald G. Daus
*Assistant Examiner*—Anne Marie T. Tighe
*Attorney, Agent, or Firm*—Samuel L. Welt; Jon S. Saxe; William M. Farley

[57] ABSTRACT

A process for selectively mono-alkylating iodinin by the steps of (a) converting iodinin to a mono-alkali metal salt, in a solvent for the salt comprising hexamethylphosphoric triamide, (b) converting the alkali metal salt of iodinin to a 1-hydroxy-6-lower alkoxyphenazine 5,10-dioxide in the solvent, and (c) recovering the product in high yield, carried out at temperatures ranging from about 5°C. to about room temperature to give high yields. In the solvent an inert organic agent, e.g., dimethylsulfoxide can optionally be used to depress the slush point of the reaction medium.

10 Claims, No Drawings

ALKYLATION OF IODININ

RELATED APPLICATIONS

This application is a continuation-in-part of U.S. patent application Ser. No. 818,448, filed Apr. 22, 1969, now abandoned.

BACKGROUND OF THE INVENTION

Iodinin (1,6-dihydroxyphenazine 5,10-dioxide), a compound which can be obtained inter alia from submerged cultures of Pseudomonas iodinin (a culture of which is on deposit with the American Type Culture Collection in Washington, D.C. and assigned number 9897), undergoes mono-O-alkylation in the presence of an alkylating agent under proper reaction conditions. However, because of the extreme low solubility of iodinin as well as its salts in conventional solvents, it has not been possible to achieve good yields of the mono-alkylation products. There is thus a need for a process whereby good yields of the mono-alkylation products of iodinin can be obtained, particularly 1-hydroxy-6-methoxyphenazine 5,10-dioxide, known as the antibiotic myxin. Myxin has previously been produced by fermentation and also synthetically in very low yields, by arduous processes, generally in aqueous media. For example, U.S. Pat. No. 3,432,505 discloses an aqueous system wherein a myxin yield of 14.4% is obtained after 4½ hours reaction at an elevated temperature, i.e., 70°C.

BRIEF SUMMARY OF THE INVENTION

This invention relates to a process of mono-alkylating iodinin at room temperature or temperatures below room temperature to produce 1-hydroxy-6-lower alkoxyphenazine 5,10-dioxide wherein the lower alkoxy moiety contains from 1 to 7 carbon atoms. The process is carried out by first converting iodinin to a mono-alkali metal salt, then mono-alkyalting the salt with conventional alkylating agents using as the reaction medium hexamethylphosphoric triamide (HMPT). A small amount of dimethylsulfoxide (DMSO) can be added to depress the slush point but this addition is not necessary to the operability of the process.

More particularly, the process of this invention is carried out in its most preferred embodiment by converting iodinin to its mono-alkali metal salt, utilizing as the reaction medium hexamethylphosphoric triamide which partially dissolves iodinin and completely dissolves the alkali metal salt of iodinin thus forming a homogeneous one-phase system. Subsequently, in this homogeneous system, the salt is mono-alkylated with conventional alkylating agents and then the product is recovered in high yield.

These processes afford better yields than the prior art processes which are carried out completely in aqueous media since the solvents permit operation under milder conditions, e.g., room temperature or lower. Operation at such relatively low temperatures is not only preferred for economic plant operations but is especially preferred in these phenazine dioxide processes since competing side reactions are minimized and thermal degradation of reactants and products are eliminated.

DETAILED DESCRIPTION OF THE INVENTION

By means of the process of this invention, iodinin is converted to its mono-lower alkyl derivatives under conditions which result in high yields and permit the use of essentially equivalent amounts of alkylating agents.

The process is carried out in two stages. The first stage is the conversion of iodinin to its mono-alkali metal salt and the second stage is the selective mono-alkylation of the salt.

In its broadest aspects, this invention comprehends the use of the mono-alkali metal salt of iodinin prepared in any convenient manner. In its most preferred embodiment, the reaction medium of this invention is used for both stages.

The first stage is carried out by reacting iodinin with an alkali metal compound. This is accomplished in the most preferred embodiment by suspending iodinin in HMPT solvent which will partially dissolve iodinin and completely dissolve the mono-alkali metal salt of iodinin and then reacting the iodinin with an alkali metal lower alkoxide to form the mono-alkali metal salt in solution.

Hexamethylphosphoric triamide (HMPT) is used in this process since it completely dissolves the mono-alkali metal salts of iodinin to form a homogeneous one-phase reaction system after the partially soluble iodinin has been reacted. This is advantageous since the mono-alkali metal salt need not be isolated prior to mono-alkylation, side reactions are minimized and high yields are obtained. If it is desired to run the reaction at temperatures below 10°C., then a small amount of an inert organic material can be added to depress the slush point of the reaction medium. We have found that the addition of, e.g., dimethylsulfoxide (DMSO), achieves this and allows reactions to take place at temperatures of about 5°C.

The reaction conditions under which the mono-alkali metal salts of iodinin are formed are variable. Thus, the reaction temperature can vary from below about 10°C. to about 35°C. The lower limit of 10°C. for the solvent is the slush point, i.e., the point of incipient solidification for this solvent. A lower operating temperature, e.g., 5°C., can be achieved by adding, e.g., about 10–15% by weight of DMSO. The temperature range of from about 5°C. to about room temperature, e.g., about 20° to 25°C., is the preferred range with operation at room temperature the most preferred embodiment. The relative molar ratios of iodinin and the alkali metal lower alkoxide are critical only insofar as the excess of the alkoxide is not too large to cause formation of dialkali metal salts of iodinin and/or mono-alkali metal salts of the mono-alkylation product which subsequently cause undesirable di-alkylation. Thus, in order to form the mono-alkali metal salt, it is preferred to have the reactants present in approximately an equimolar ratio.

Suitable alkali metal lower alkoxides are the sodium or potassium lower alkoxides containing from 1 to 4 carbon atoms in either straight or branched chains. The preferred alkali metal lower alkoxide is potassium t-butoxide.

The time utilized for the preparation of the mono-alkali metal salt should be sufficient to complete the reaction and can vary within rather wide limits; however, the reaction is usually completed within about 3 hours. It is advantageous to run the reaction for at least 10 hours or overnight in order to insure complete conversion.

The most preferred reaction conditions for forming the mono-alkali metal salt of iodinin are room temperature, e.g., about 20°–25°C., overnight, using approximately equimolar amounts of the reactants, e.g., iodinin and potassium t-butoxide, in HMPT. While the specific source of the mono-alkali metal salts of iodinin is not critical to this process, the essentially quantitative formation of the salt in situ in solution, particularly when HMPT is the solvent, obviates the necessity of preparing the compound and isolating it for subsequent mono-alkylation reactions.

Thus, some advantages of the process of the preferred embodiment of this invention are that the mono-alkali metal salt of iodinin is produced in homogeneous solution and can be directly and efficiently alkylated to form the mono-alkyl derivatives of iodinin in high yields. The process of this invention is advantageous since its operation at room temperature or lower minimizes side reactions and thermal degradation of the product and is thus preferred economically.

The second stage of the process of this invention, selective mono-alkylation of the mono-alkali metal salt of iodinin is, in the most preferred embodiment, achieved by treating the reaction solution from the first stage with an alkylating agent. It is understood that the reaction solution can be formed from the mono-alkali metal salt of iodinin, derived from any source by dissolving the salt in HMPT. However, it is preferred to utilize the solution formed as a result of the process described herein for forming the mono-alkali metal salt. Suitable alkylating agents include dialkyl sulfate, alkyl iodide and alkyl tosylates. The particular desired substituent dictates the particular alkylating agent to be used. Preferred for use in the process of the invention are lower alkylating agents containing from 1 to 7 carbon atoms in the alkyl groups. For example, if a methyl substituent is desired, then dimethyl sulfate or methyl iodide can be used.

The amount of alkylating agent utilized can vary; however, it has been found sufficient to use from about 1 to about 2 moles of alkylating agent per mole of alkali metal salt of iodinin. Preferably, about 1.5 moles of alkylating agent per mole of alkali metal salt of iodinin is utilized. This amount of alkylating agent is sufficient to insure a fast, complete reaction, more has no substantial advantage.

The alkylation reaction conditions can be varied. Suitable temperature ranges which provide high yields are from about 10°C. to about 35°C. when HMPT is used and about 5°C. when the solvent contains a slush point depressant, e.g., 10–15% by weight of DMSO. The temperature range of from about 5°C. to about room temperature, e.g., about 20°C. to 25°C., is the preferred range with operation at room temperature the most preferred embodiment. As noted above, the lower limit for the solvent is the slush point. Because of the known thermal sensitivity of phenazine dioxides, the preparatory process should not be run at elevated temperatures, i.e., above about 35°C. For example, myxin is completely decomposed after refluxing for 4 hours in chloroform (b.p. 61°C.). The chart below clearly shows the deleterious effects of temperature on the myxin preparatory process.

| Reaction Solvent | Reaction Temperature, °C. | Yield of Myxin, % |
|---|---|---|
| HMPT/DMSO | 5°C. (slush point) | 65 |
| HMPT | 20°C. – 25°C. | 69 |
| HMPT | 35°C. | 32 |
| HMPT | 70°C. | 0 |

Reaction times sufficient to complete the reaction, usually from about 1 hour to overnight (i.e., about 15 hours) are used. Since the reaction is fast and has essentially gone to completion within a few hours, longer times are used merely for convenience.

The preferred mode of the process of this invention is carried out by adding about 1.5 moles of alkylating agent to a homogeneous one-phase solution of the mono-potassium salt of iodinin in HMPT at room temperature, e.g., about 20°C. to 25°C. and completing the reaction in about 3 hours.

The product, i.e., 1-hydroxy-6-lower alkoxyphenazine 5,10-dioxide, can be isolated by conventional procedures. Thus, it can be precipitated by the addition of water to the reaction solution. Preferably, cold water, e.g., ice-water is used. The product then can subsequently be recovered from the resulting suspension either by extraction or filtration and purified by chromatography and/or crystallization.

The yields of 1-hydroxy-6-lower alkoxyphenazine 5,10-dioxide as a result of the process of this invention are about 70% based on iodinin.

The following Examples make available to one skilled in the art the process of this invention.

EXAMPLE 1

Preparation of mono-potassium salt of iodinin using hexamethylphosphoric triamide as the solvent 1.30 Grams of potassium t-butoxide (0.0116 m) was added with stirring to 2.44 grams of iodinin (0.01 m) suspended in 150 ml. of hexamethylphosphoric triamide (HMPT). The mixture was stirred at room temperature overnight to yield an emerald colored solution of the mono-potassium salt to iodinin in HMPT.

EXAMPLE 2

Preparation of 1-hydroxy-6-methoxyphenazine 5,10-dioxide using hexamethylphosphoric triamide as the solvent 1.30 Grams of potassium t-butoxide (0.0116 m) was added with stirring to 2.44 grams of iodinin (0.01 m) suspended in 150 ml. of hexamethylphosphoric triamide (HMPT). The mixture was stirred at room temperature overnight. 1.4 Ml. dimethyl sulfate (0.015 m) was added to the resulting emerald solution and stirring was continued. After another 3 hours, the reaction mixture was poured into 1000 ml. ice water. The aqueous mixture was extracted with 3 × 500 ml. ethyl acetate. The organic extracts were washed with 2 × 300 ml. water. The water washings were reextracted with 2 × 250 ml. benzene. The organic phases were combined, dried over anhydrous magnesium sulfate, filtered and evaporated in vacuum. The residue was dissolved in 200 ml. methylene chloride. The resulting solution was filtered through a sintered glass funnel. The filtrate was applied to a chromatography column prepared from 100 grams silica gel slurried in methylene chloride. The column was developed with a mixture of methylene chloride and ethyl acetate (2:1). The fractions containing pure myxin were combined and evaporated in vacuum. The residue was redissolved in 100 ml. boiling methylene chloride. The solution was diluted with 150 ml. hot acetone. On cooling 1.781 grams of 1-hydroxy-6-methoxyphenazine 5,10-dioxide crystallized giving a yield of 69% based on the iodinin.

EXAMPLE 3

Preparation of 6-(3-methylbutoxy)-1-phenazinol 5,10-dioxide using hexamethylphosphoric triamide as the solvent 4.2 Grams of potassium t-butoxide were added to a suspension of 7.32 grams iodinin in 450 ml. hexamethylphosphoric triamide. The mixture was stirred at room temperature overnight. 30 Ml. of 1-bromo-3-methylbutane were then added and stirring was continued for 10 more hours. The reaction was then poured into ice water and extracted three times with ethyl acetate. The organic extracts were diluted with benzene washed with water, dried over magnesium sulfate and evaporated to dryness under reduced pressure. The solid residue was redissolved in methylene chloride and chromatographed on silica gel. Fractions containing 6-(3-methylbutoxy)-1-phenazinol 5,10-dioxide were combined, evaporated and recrystallized from methylene chloride acetone to yield 2.8 grams of the product giving a yield of 30% based on iodinin.

EXAMPLE 4

Preparation of 1-hydroxy-6-methoxyphenazine 5,10-dioxide using a solvent mixture of hexamethylphosphoric triamide and dimethylsulfoxide and a reaction temperature of 5°–10°C.

910 Grams of potassium t-butoxide were added with stirring over a 1-hour period to 1000 grams of iodinin suspended at 10°C. in a mixture of 46 liters of hexamethylphosphoric triamide and 6.9 liters of dimethylsulfoxide. An additional 1000 grams of iodinin, wet with 0.3 liters of DMSO and 4.5 liters of HMPT were added. The reaction mixture was warmed to room temperature and stirring was continued for 24 hours. The mixture was then cooled to +5°C. and 1000 ml. of dimethylsulfate was added, with stirring, over a 1-hour period. Stirring was continued for 3 hours at +5°C. followed by overnight stirring at room temperature. The mixture was then poured with stirring into 66 gallons of ice water. Solid myxin was separated by vacuum filtration, washed with water and refiltered. The crude myxin was dissolved in 50% aqueous sulfuric acid and complexed with ferric chloride. The resulting black solid was separated by filtration and washed with glacial acetic acid and chloroform. The black solid complex was broken with acetone and crystallized myxin was filtered and washed with water to obtain 1374 grams of myxin, a yield of 65% based on iodinin.

EXAMPLE 5

Preparation of 1-hydroxy-6-methoxyphenazine 5,10-dioxide using hexamethylphosphoric triamide at a reaction temperature of 35°C.

The mono-potassium salt of iodinin was prepared from 50 grams of iodinin suspended at 35°C. in 1.5 liters of hexamethylphosphoric triamide at 35°C. using 22.8 grams of potassium t-butoxide in the manner described in Example 1.

The reaction mixture was maintained at 35°C. while 25 ml. of dimethyl sulfate were added, with stirring, over a 1-hour period. Stirring was continued for 3 hours at 35°C. followed by overnight stirring at room temperature. Solid myxin was separated by vacuum filtration and washed with water. Purification and identification by Thin Layer Chromatography (TLC) as described in Example 2 provided 17 grams of myxin, a yield of 32% based on iodinin.

EXAMPLE 6

Preparation of 1-hydroxy-6-methoxyphenazine 5,10-dioxide using a hexamethylphosphoric triamide at a reaction temperature of 70°C.

Following the procedure described in Example 5, the mono-potassium salt of iodinin was prepared at 70°C.

The reaction mixture was maintained at 70°C. while 50 ml. of dimethyl sulfate were added, with stirring over a 1-hour period. Stirring was continued for 3 hours at 70°C. followed by overnight stirring at room temperature. During the 3 hour reaction period, the color of the solution changed from a deep red to an orange color.

The solid material that formed was separated by vacuum filtration and washed with water. Purification and identification by Thin Layer Chromatography (TLC) as described in Example 2 showed no 1-hydroxy-6-methoxyphenazine 5,10-dioxide present. The major product was 1-hydroxy-6-methoxyphenazine 10-oxide, a degradation product of myxin.

This example is thus illustrative of the degradation effect of elevated temperatures on phenazine dioxides.

We claim:

1. A process for converting 1,-6-dihydroxyphenazine 5,10-dioxide to a 1-hydroxy-6-lower alkoxyphenazine 5,10-dioxide comprising the steps of
   a. reacting at a temperature of from about 5°C. to about 35°C. 1,6-dihydroxyphenazine 5,10-dioxide with about an equimolar amount of an alkali metal lower alkoxide in hexamethylphosphoric triamide to form the mono-alkali metal salt,
   b. reacting the salt thus formed in the hexamethylphosphoric triamide and at the same temperature with from about 1 to about 2 moles of an alkylating agent per mole of the salt, wherein the alkyl group of the alkylating agent contains from 1 to 7 carbon atoms and
   c. recovering 1-hydroxy-6-lower alkoxyphenazine 5,10-dioxide.

2. The process of claim 1 wherein step (a) is carried out at a temperature of from about 20°C. to about 25°C. for a time sufficient to complete the reaction and step (b) is carried out at a temperature of from about 20°C. to about 25°C. for a time sufficient to complete the reaction.

3. The process of claim 1 wherein the alkali metal lower alkoxide is potassium t-butoxide.

4. The process of claim 3 wherein the alkylating agent is dimethylsulfate and the product is 1-hydroxy-6-methoxyphenazine 5,10-dioxide.

5. A process for preparing a 1-hydroxy-6-lower alkoxyphenzine 5,10-dioxide comprising the steps of reacting a mono-alkali metal salts of 1,6-dihydroxyphenazine 5,10-dioxide in hexamethylphosphoric triamide with about 1 to about 2 moles of an alkylating agent per mole of salt, wherein the alkyl group of the alkylating agent contains from 1 to 7 carbon atoms, at a temperature of from about 5°C. to about 35°C. for a time sufficient to complete the reaction and recovering the 1-hydroxy-6-lower alkoxyphenazine 5,10-dioxide product.

6. The process of claim 5 wherein the mono-alkali metal salt is the mono-potassium salt and the alkylating agent is dimethylsulfate.

7. A process for producing 1-hydroxy-6-methoxyphenazine 5,10-dioxide comprising the steps of
   a. reacting in solution 1,6-dihydroxyphenazine 5,10-dioxide with about an equimolar amount of potassium t-butoxide in hexamethylphosphoric triamide at room temperature for a time sufficient to complete the reaction and form the mono-potassium salt, then
   b. without isolating the resulting salt from solution, reacting it with about 1.5 moles of dimethylsulfate per mole of salt at room temperature for a time sufficient to complete the reaction and
   c. recovering the product.

8. A process for converting 1,-6-dihydroxyphenazine 5,10-dioxide to its mono-alkali metal salt comprising the steps of reacting 1,-6-dihydroxyphenazine 5,10-dioxide with about an equimolar amount of an alkali metal lower alkoxide at a temperature of from about 5°C. to about 25°C. in hexamethylphosphoric triamide.

9. The process of claim 8 wherein the alkali metal lower alkoxide is potassium t-butoxide.

10. The process of claim 9 wherein the reaction temperature is room temperature.

* * * * *